Feb. 20, 1968    SUSUMU SEKI ET AL    3,370,239
NUMERICAL CONTROL SYSTEM FOR COMMAND SPEEDS
OF TRI-DIMENSIONAL DISPLACEMENTS
Filed Sept. 15, 1964    4 Sheets-Sheet 4

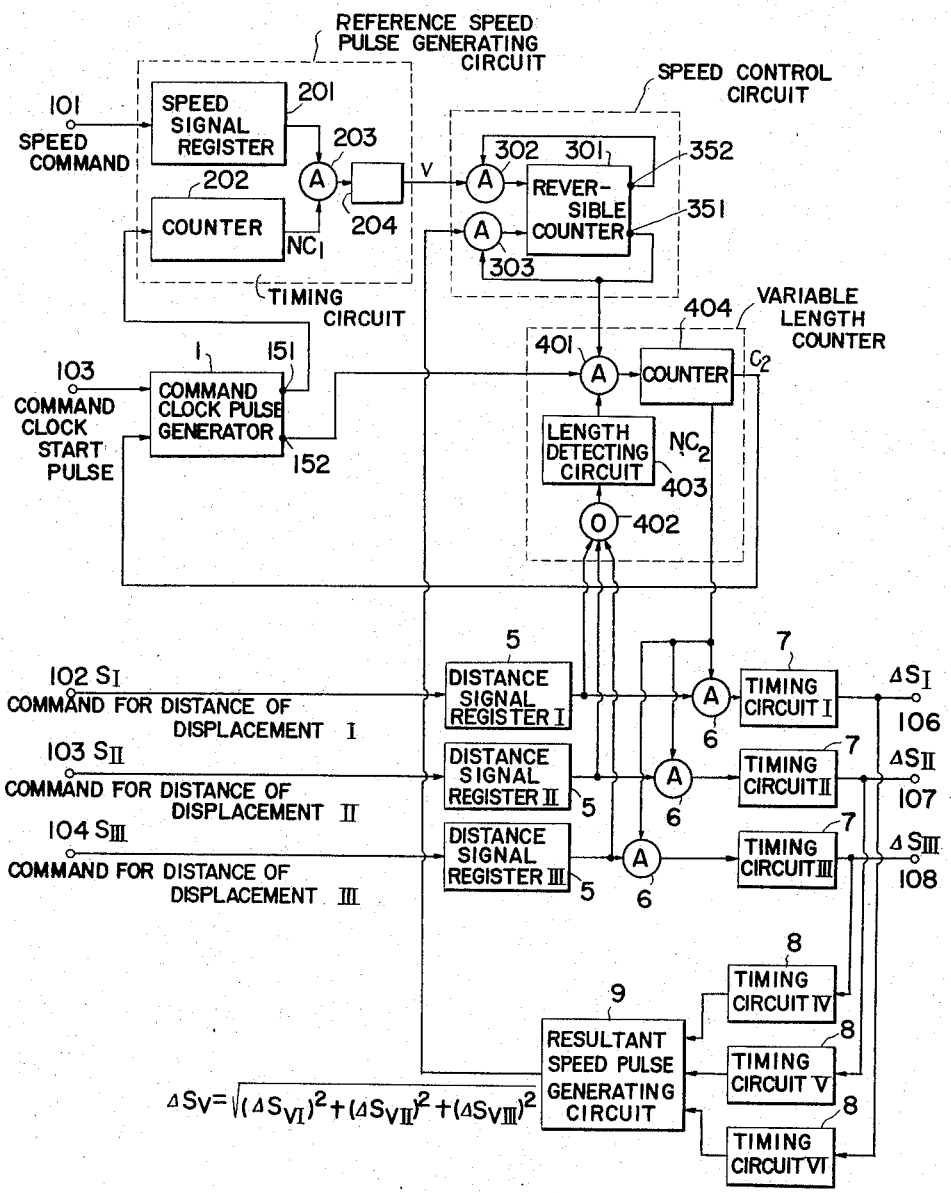

INVENTOR.
Susumu Seki
Yuichiro Oya
Hirokazu Ando

Western & Western

United States Patent Office 3,370,239
Patented Feb. 20, 1968

3,370,239
NUMERICAL CONTROL SYSTEM FOR COMMAND SPEEDS OF TRI-DIMENSIONAL DISPLACEMENTS
Susumu Seki, Kokubunji-machi, Yuichiro Oya, Kodaira-shi, and Hirokazu Ando, Totsuka-machi, Japan, assignors to Kabushiki Kaisha Hitachi Seisakushi, Tokyo-to, Japan, a joint-stock company of Japan
Filed Sept. 15, 1964, Ser. No. 396,660
Claims priority, application Japan, Sept. 26, 1963, 38/50,742
1 Claim. (Cl. 328—155)

ABSTRACT OF THE DISCLOSURE

A numerical control system for the control of the command speed of tridimensional replacement of an object, for instance, but not limited to, the cutting operation in a machine tool. A reference speed pulse train is established which is proportional to a numerical value, corresponding to the speed of the object, and is compared to a resultant speed pulse train, proportional to the speed of displacement of the object. The latter is controlled so as to decrease the difference between the two pulse trains.

---

This invention relates to process control systems. More particularly, the invention concerns a new numerical control system for controlling process variables such as, for example, three-dimensional relative displacements between the cutting tool and the work in a machine tool, through the use of electrical pulses.

It is a prime object of the invention to eliminate or substantially reduce errors between the command speed of relative displacement as mentioned above which have been specified on a command tape and the actual resultant speed of velocity components with respect to the respective coordinate axes in a multi-dimensional space which are imparted as outputs in correspondence to said command speed.

For controlling numerically, through the use of certain electrical pulse trains, the movements of a certain object, a known method comprises, for example, supplying these pulses to a pulse motor which thereby causes an object to be controlled to undergo movement, in such a manner that the length of displacement of this movement corresponds to the total number of pulses in each pulse train, and, moreover, the displacement speed is proportional to the pulse frequency of each pulse train.

In accomplishing numerical control in this manner, the ordinary practice is to cause the number of pulses in the pulse train supplied to the pulse motor to be determined by a certain number (distance of displacement) set beforehand in the command tape. For determining the frequency of this pulse train, that is, for the command of the speed with which one part of the controlled object is displaced, the following two methods have heretofore been used.

(1) The method whereby a number corresponding to the required speed (for example, the feed rate in a machine tool) is specified directly by command (set beforehand in the command tape), and control is carried out on the basis of this number: (speed command method) and (2) The method whereby a number corresponding to the required time as computed from the distance of displacement (feed distance) and the required speed is specified by command, and control is carried out on the basis of this number: (time command method).

In the case where the time command method (above method (2)) is used, it is necessary to compute the actual distance of resultant displacement from the distance of displacement of each control axis (for example, X, Y, and Z space axes) for each block in the required length of displacement, and, with consideration of the required displacement speed, to compute the time duration of displacement corresponding to said displacement speed.

This means that, in the establishment of the control command (establishment of programming in a medium such as a perforated tape), it is necessary to compute the displacement time necessary for each block resulting from punctuation at suitable intervals of the locus of the displacement of the controlled object. This necessity increases the complexity in computation, and, moreover, requires an inordinate amount of time and expenditure. Therefore, this method is extremely disadvantageous in actual practice.

By the speed command method (above method (1)) the disadvantages of the above method (2) are, in principle, completely eliminated in the case of one-dimensional control, and the programming becomes extremely simple. However, in the case of multi-dimensional control, wherein the velocity components in the directions of the coordinate axes are imparted separately, the composing of the command tape becomes even more complicated than that in the above method 2.

Furthermore, in the case of a method wherein only the velocity component with respect to the axis of maximum displacement distance is specified by command, and the velocity components with respect to the other axial directions are imparted automatically in accordance with the ratio of their respective displacement distances, it is necessary, in composing the command tape, to determine the velocity component in the direction of the axis of maximum displacement distance. The complexity of this determination is not greatly different from that in the above method 2.

On one hand, if control is exercised so as to cause the velocity component in the direction of the axis of maximum displacement distance equal to the speed specified on the command tape, the resultant speed will have a great error relative to the speed specified on the command tape. This error increases with the number of control axes.

From the above consideration it is apparent that, if it were possible to impart the resultant speed of displacement of the controlled object directly as a command, it would be possible to eliminate the complexity of computation and the uneconomical nature of time and expenditure, whereby great advantage would be gained over the method of specifying the displacement time.

It is an object of the invention to overcome, by the use of the above stated system, the difficulties of complicated computation and uneconomical time and expenditure which occur in the practice of the aforementioned time command method.

It is a further object to provide a numerical control system in which the aforementioned speed command method is practiced in the most logical manner and in a highly adaptable form.

The specific nature, principle and details of the invention will be more clearly apparent by reference to the following description, taken in conjunction with the accompanying drawings in which like parts are designated by like reference characters, and in which:

FIGURES 2 and 3 are block diagrams showing embodiments of the control system according to the invention;

Figure 1:
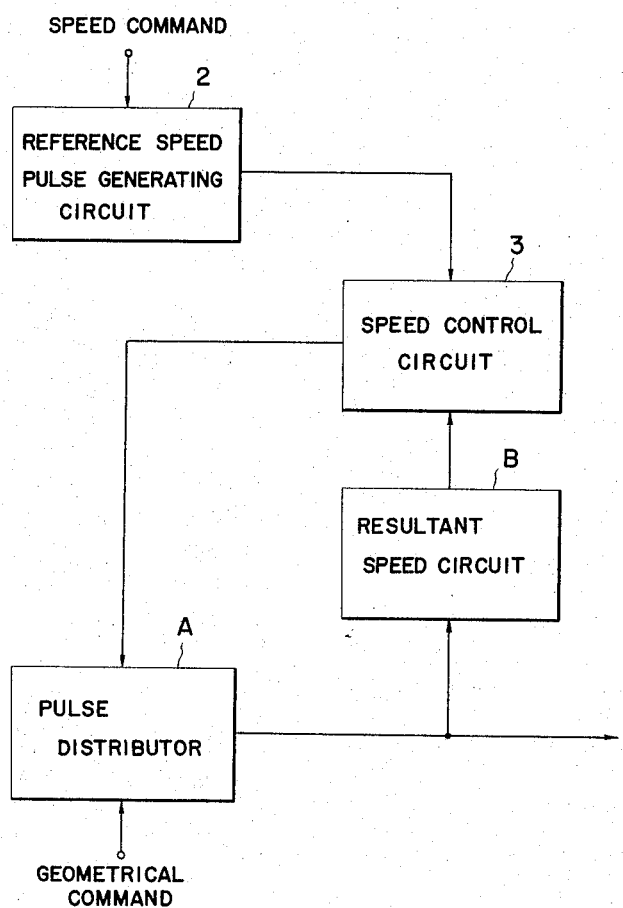
FIGURE 1 is a block diagram indicating in simplified form the principle of the control system according to the invention.

From the above-mentioned consideration and for the purpose of attaining the said objects and other objects of this invention, the present invention contemplates the provision of a novel numerical control system the principle-arrangement of which is shown in FIG. 1. The system of FIG. 1 comprises a reference speed pulse generating circuit 2 which generates a pulse train whose density is proportional to the commanded speed; a pulse distributor A which distributes the pulses to each control axis so as to fulfill the requirements of the geometrical feature of the relative displacement and which changes the pulse distributing frequency under control of the output of the speed control circuit 3 stated below; a resultant speed circuit B which extracts a pulse train having a density proportional to the resultant speed of the relative displacement governed by the pulse trains distributed by said pulse distributor A from pulse trains distributed by said pulse distributor A; and a speed control circuit adapted to compare the output pulse train of said reference speed pulse generating circuit 2 with the output pulse train of the resultant speed circuit B and to control the pulse distributor so as to equalize the mean densities of said pulse trains, thus enabling equalization of said resultant speed to the commanded speed.

According to the system such as shown in FIG. 1, the displacement speed of the controlled object can be imparted directly as a command, and, moreover, the error arising between the actual resultant speed and the command speed can be controlled to be of a value within a range (approximately 10 percent) which can be neglected in actual practice, whereby it has become possible to obtain a numerical control system which can overcome the difficulties of complicated computation and uneconomical time and expenditure which occur in the practice of the above-mentioned time command method and practice the above-mentioned speed command method in the most logical manner and in a highly adaptable form.

First, a constructional embodiment of this invention will be described.

Figure 2:
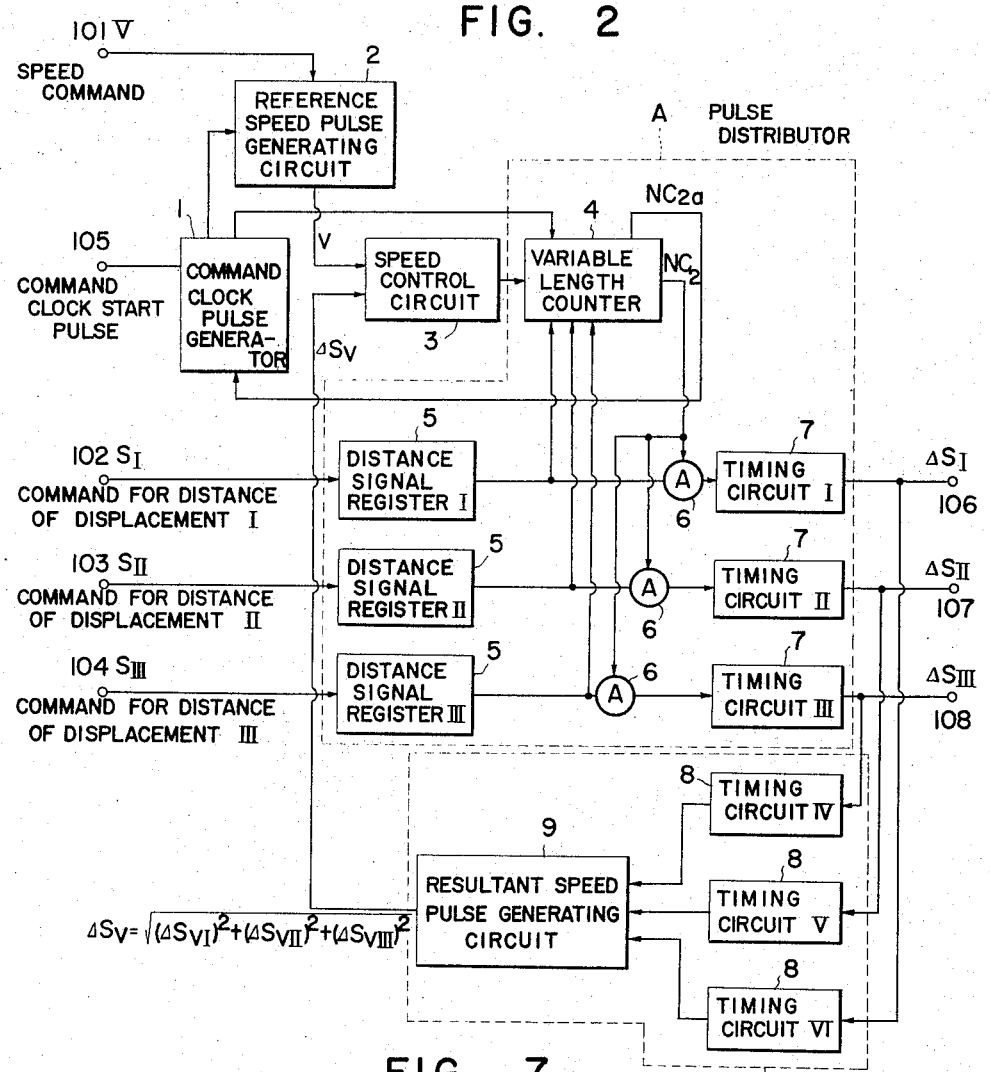

Referring to FIGURE 2, which illustrates in an extremely simple manner a case of three-dimensional control, a speed command signal V is applied to a terminal 101, and command signals for displacement distance $S_I$, $S_{II}$, and $S_{III}$ are applied respectively to terminals 102, 103, and 104. This speed signal and these distance signals are stored respectively in a speed signal register installed within a reference speed pulse generating circuit 2 and in distance registers I, II, and III.

A command clock start pulse is applied to a terminal 105 to cause a command clock pulse generator 1 to operate.

The reference speed pulse generating circuit 2 generates output pulses V with a period corresponding to the command speed V.

A speed control circuit 3 operates to maintain equal the output V of the reference speed pulse generating circuit 2 and the output $\Delta S_V$ of a resultant speed pulse generating circuit to be described hereinafter. The output pulses of this speed control circuit are sent to a variable length counter 4.

On one hand, the variable length counter 4 detects the digits in which the initial pulses throughout the three registers I, II and III of a distance signal register 5 exist, and accordingly determines the digits of the counter 4 into which the output of the speed control circuit 3 should be introduced.

Here the maximum number of digits of the counter 4 must, of course, be equal to or greater than the maximum number of digits of the distance signal register 5. That is, the number of digits of the counter is varied by the content of the distance signal register 5 (i.e., the magnitude of the command displacement distance) to prevent the occurrence of speed error due to the magnitude of the command displacement distance.

In this manner, the variable length counter 4 counts the output of the speed control circuit 3 with the number of digits equal to the maximum number of digits of the numbers stored in the distance signal registers I, II, and III and generates non-carry pulses $NC_2$ of a number equal to that which can be counted with said number of digits. After all of the non-carry pulses $NC_2$ have been generated, a carry pulse $NC_{2a}$ is generated from the most significant bit of the counter, whereupon the command clock pulse generator 1 stops, and the operation of this system stops.

Then, the non-carry pulses $NC_2$ produced by the variable length counter 4 and the output of the distance signal register 5 are sent to three AND gates 6, the outputs of which become respectively equal to the numbers stored in the distance signal register 5.

The outputs of the AND gates 6 are then introduced into three timing circuits 7, where they are caused to coincide with suitable timings, and appear at terminals 106, 107, and 108 as outputs $\Delta S_I$, $\Delta S_{II}$, and $\Delta S_{III}$, respectively. The three output pulse trains, in correspondence with three-dimensional components of displacement distance and displacement speed established in the command tape, are respectively supplied to at least three servomechanisms of the pulse controlled type, whereby the required three-dimensional relative displacement of the controlled object is obtained.

In the system of this invention, the outputs $\Delta S_I$, $\Delta S_{II}$, and $\Delta S_{III}$ of the timing circuits 7 are further applied to three timing circuits 8, where they are staggered by a suitable time difference, and are then introduced into a resultant speed pulse generating circuit 9. In this circuit 9, the resultant speed $$\Delta S_v = \sqrt{(\Delta S_{vI})^2 + (\Delta S_{vII})^2 + (\Delta S_{vIII})^2}$$

is computed from the outputs $\Delta S_I$, $\Delta S_{II}$, and $\Delta S_{III}$ which have been retarded by a suitable time difference in the timing circuits 8, and this resultant speed is fed back to the speed control circuit 3.

By this arrangement, it is possible, in the speed control circuit 3, to cause the resultant speed $\Delta S_v$ of the resultant speed pulse generating circuit 9 to be always equal to the output V of the reference speed pulse generating circuit 2. Therefore, the error between the speed on the command tape and the actual resultant speed which arises in multi-dimensional control as mentioned hereinbefore is held within a practically allowable range, whereby a prime object of the present invention is achieved.

In order to indicate still fully the nature of the invention, the following description with respect to an embodiment thereof utilizing a time division method is set forth.

Referring to FIGURE 3, the input signals applied to terminals 101, 102, 103, and 104 have all been serialized with respect to time, and the outputs appearing at the output terminals of a speed register 201 and a distance register 5 also all appear with the elapse of time, and the period with which they appear is determined by the maximum number of digits of the input signal.

For the dynamic flip-flops constituting the counters, registers, and other parts of this embodiment of the invention, the capacitor time memory circuits disclosed in U.S. Patent Ser. Nos. 252,110 and 252,111 filed on Jan. 17, 1963 were used.

In the operation of this system, when a command clock start pulse for starting the operation is applied to a terminal 105, a command clock pulse generator 1 operates and sends a command clock pulse to a counter 202 of a reference speed pulse generating circuit 2 and an AND gate 401 of a variable length counter 4.

The command clock pulse (command clock pulse (1)) which appears at an output terminal 151 (of the command clock pulse generator 1) appears as only one pulse in the first digit of each cyclic period, and the command clock pulse (command clock pulse (2)) which appears at an output terminal 152 appears in all digits of one cycle period. The counter 202 counts this command clock pulse and always generates only one non-carry pulse $NC_1$ with one of the digits during one cyclic period.

The output of the speed signal register 201 is such that all of the information stored during one cyclic period appears, and the most significant bit appears first. Therefore, if the product (AND) of the non-carry pulse $NC_1$ and the output of the speed signal register 201 is obtained by means of an AND gate 203, the output of the AND gate 203 will appear at the digit corresponding to the simultaneous issuance of the output of the speed signal register 201 and a non-carry pulse V.

Furthermore, in the output of the AND gate 203, there appears pulses of a number equal to the informational content of the speed signal register 201 prior to the appearance of a carry pulse from the counter 202.

In this example shown in FIGURE 3, the distance through which the controlled object is displaced is determined by one pulse, and the period with which the carry pulse of the counter 202 is generated is caused to be a unit time. Accordingly, the output of the AND gate 203 is produced only in a number equal to the informational content of the speed signal register 201 in the unit time and, as a result, becomes equal to the speed specified on the command tape.

The output of the AND gate 203 is caused by a timing circuit to be the first sent in one cyclic period and becomes the output V of the reference speed pulse generating circuit 2.

A reversible counter 301 in a speed control circuit 3 produces an output at an output terminal 351 only when it is in a certain state (state 1) and sends this output to the AND gate 401 of the variable length counter 4. At this time, there is no output at the output terminal designated by reference numeral 352. When the counter 301 is in another state (state 2), an output appears at the terminal 352, and no output appears at the terminal 351.

The output V of the AND gate 203 functions to place the reversible counter 301 in the aforementioned state 1, and the output $\Delta S_v$ of a resultant speed pulse generating circuit 9 functions to place the reversible counter 301 in the state 2.

Then, since the reversible counter 301 is first in the state 1, outputs $\Delta S_I$, $\Delta S_{II}$ are produced by an operation described hereinafter, whereby the output $\Delta S_v$ of the resultant speed pulse generating circuit 9 is generated. Then, since the output of the output terminal 351 is being applied to an AND gate 303 on the input side of the speed control circuit 3, the output $\Delta S_v$ passes through the AND gate 303 to cause the reversible counter 301 to assume the state 2. At this time, if the number of pulses of the output $\Delta S_v$ is $n$, the reversible counter 301 will be caused to assume the state 2 by a multiple $n$. Accordingly, an output appears this time at the terminal 352, and, since the terminal 352 is connected to an AND gate 302 at the input side of the reversible counter 301, the $n$ pulses of the output V of the reference speed pulse generating circuit 2 enter to return the reversible counter 301 to the state 1.

Thus, for the output of the reversible counter 301 to enter the variable length counter 4 and for the outputs $\Delta S_I$, $\Delta S_{II}$, and $\Delta S_{III}$ to be generated, the output $\Delta S_v$ of the resultant speed pulse generating circuit 9 and the output V of the reference speed pulse generating circuit 2 must enter the speed control circuit 3 with equal number of pulses. That is, since the outputs $\Delta S_I$, $\Delta S_{II}$, and $\Delta S_{III}$ are then produced always with a time constant $V=\Delta S_v$, the actual resultant speed becomes always equal to the speed specified on the command tape.

The respective outputs of the registers I, II, and III of the distance register 5 are such that, similarly as in the case of the speed register 201, all of the stored informational content appear during one cyclic period, the sequence thereof is such that the most significant digits appear first. The outputs of these distance registers enter an OR gate 402 of the variable length counter 4, and a length detecting circuit 403 detects, from within the output of the OR gate 402, the pulse which appears first during one cyclic period. Therefore, the circuit 403 sends to the AND gate 401 one pulse in each cyclic period with the timing of the digits thereof.

Since output of the speed control circuit 3 and the output of the command clock pulse generator are sent out for all digits of each cyclic period, the timing of the output of the AND gate 401 becomes equal to the timing of the output of the length detecting circuit 403. Thus, the number of digits of the counter 404 differs depending on the digit timing in one cyclic period at which the input enters.

As described above, the input into the counter 404, appears with the timing of the most significant digit of the maximum number of three numbers which exist in the distance registers I, II, and III. Consequently, the number of digits of the counter 404 always becomes equal to the maximum number of digits stored in the distance registers I, II, and III. The counter 404 counts the output of the AND gate 401 and sends a non-carry pulse $NC_2$ to three AND gates 6, in which the non-carry pulse $NC_2$ is multiplied with the respective outputs of the distance registers I, II, and III.

As a result, the output of the three AND gates 6 appear in numbers equal, respectively, to the stored contents of the distance registers I, II, and III by the time the carry pulse of the counter 404 is produced.

In this manner, the non-carry pulse $NC_2$ of the counter 404 does not become excessive or deficient during its multiplication at the AND gates 6 with the outputs of the distance registers I, II, and III. Therefore, a discrepancy due to the magnitude of command displacement distance between the actual resultant speed and the speed specified on the command tape does not occur.

That is, the outputs of the three AND gates 6 are caused to conform to a certain timing by means of three timing circuits 8 to assume their final output form of $\Delta S_I$, $\Delta S_{II}$, and $\Delta S_{III}$ as described hereinbefore. Thus, it can be observed that the resultant speed of the combination of the outputs $\Delta S_I$, $\Delta S_{II}$, and $\Delta S_{III}$ is equal to the speed specified on the command tape, and that the number thereof is equal to the command distance.

The outputs $\Delta S_I$, $\Delta S_{II}$, and $\Delta S_{III}$ further pass through three timing circuits 8, where they are respectively staggered with a certain timing and then sent to a resultant speed pulse generating circuit 9. The resultant speed pulse generating circuit 9 computes, from the generated condition of the outputs $\Delta S_I$, $\Delta S_{II}$, and $\Delta S_{III}$, the square root of the sum of the squares of the speeds $\Delta S_{v_I}$, $\Delta S_{v_{II}}$, $\Delta S_{v_{III}}$, of the respective axes, that is, the resultant speed $$\Delta S_v = \sqrt{(\Delta S_{v_I})^2 + (\Delta S_{v_{II}})^2 + (\Delta S_{v_{II}})^2}$$

The computed result is sent to the speed control circuit 3.

The above-mentioned resultant speed pulse generating circuit 9 will now be described more fully. For convenience in description, a method of computing $$\Delta S_{v_a} = \sqrt{(\Delta S_{v_I})^2 + (\Delta S_{v_{II}})^2}$$

will first be considered.

Hereinafter, it will be assumed that the timing circuits VI and V are so arranged that the pulse train of $\Delta S_{v_I}$ and the pulse train of $\Delta S_{v_{II}}$ do not overlap in time. Furthermore, for the sake of simplicity, the output of the timing circuit VI will be denoted by X, and the output of the timing circuit V will be denoted by Y.

Figure 6:
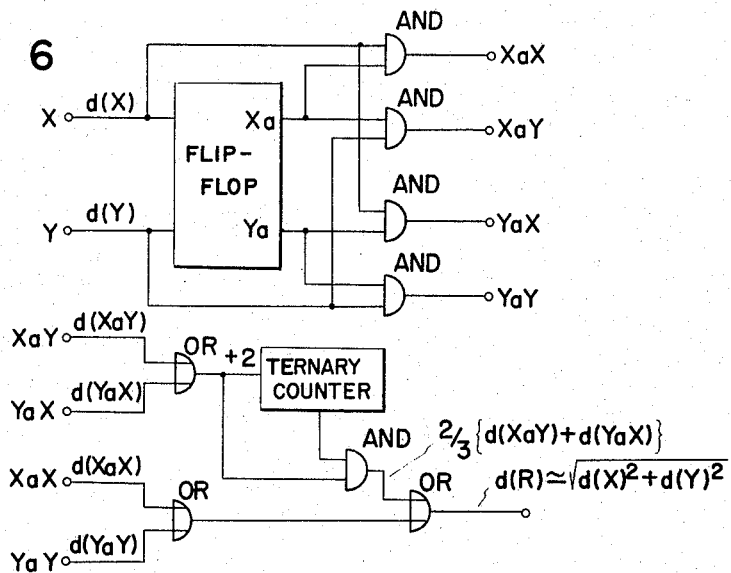

Referring to FIGURE 6, X and Y are connected to the two terminals of a flip-flop FF. When one pulse is applied to the X terminal, an output "1" is produced at an output terminal Xa, and an output "0" is produced at an output terminal Ya. This state is maintained until a pulse is applied to the Y terminal.

Similarly, when one pulse is applied to the Y terminal, an output "1" is produced at the terminal Ya, and an output "0" is produced at the terminal Xa. This state is maintained until a pulse is next applied to the X terminal.

Furthermore, the terminals X, Y, Xa, and Ya through respective AND gates of a group become output terminals XaX, XaY, YaX, and YaY. When a pulse is applied first to terminal X, and then, without a pulse being applied to terminal Y, a pulse is again applied to terminal X, one pulse is produced at terminal XaX. When a pulse is applied first to terminal X, and then a pulse is applied to terminal Y, one pulse is produced at the terminal XaY. Similarly, when a pulse is applied first to terminal Y, and then a pulse is applied to terminal X, one pulse is produced at terminal YaX.

The outputs from terminals XaY and YaX are combined by OR gates and then applied to a ternary counter (capable of assuming the three states of "0," "1," and "2"), thereby to increase the content of this ternary counter by 2 and, simultaneously, through an AND gate controlled by the content of the ternary counter, are combined by an OR gate with the outputs from terminals XaX and YaY.

That is, in the case when the content of the ternary counter prior to the application of the aforementioned combined pulse is "1" or "2," the state is "ON," and in the case when said combined pulse is "0," the state is "OFF," whereby, a pulse is caused to pass at the time when the ternary counter overflows. Accordingly, the output pulses of terminals XaY and YaX add 2 to the ternary counter and produce a pulse corresponding to the resulting overflow, whereby the mean density thereof is caused to be reduced to 2/3.

Then, by denoting the mean densities of the pulse trains from terminals XaX, XaY, YaX, and YaY respectively by $d(XaX)$, $d(XaY)$, $d(YaX)$, and $d(YaY)$, the mean density of the output combined pulse train can be expressed as follows:

$$d(XaX)+d(YaY)+\frac{2}{3}\{d(XaY)+d(YaX)\}$$

Therefore, by denoting the mean pulse densities of the input pulse trains of the terminals X and Y respectively by $d(X)$ and $d(Y)$, assuming $d(X)$ to be equal to or greater than $d(Y)$, and by considering the point that, as is apparent from the mechanism of generation of the Y terminal input pulse train, the pulses within each pulse train are distributed substantially uniformly in time and the point that they are prevented from mutually overlapping in time by the aforementioned timing circuit, the following approximate relationships are obtained.

$$d(XaX)=d(X)-d(Y),\ d(XaY)=d(Y)$$

$$d(YaX)=d(Y),\ d(YaY)=0$$

Accordingly, the mean density $d(R)$ of the output com- similarly as follows:

$$d(R)=d(X)+\frac{1}{3}d(Y)$$

In the case of $d(X) \leq d(Y)$, the mean density $d(R)$ is similarly as follows:

$$d(R)=d(Y)+\frac{1}{3}d(X)$$

In order to study the relationship between $d(R)$ and $\sqrt{d(X)^2+d(Y)^2}$, quantities $\gamma$ and $\theta$, which are expressed by the following equations, are introduced.

$$\frac{d(R)}{\sqrt{d(X)^2+d(Y)^2}}=\gamma$$

$$\frac{d(X)}{\sqrt{d(X)^2+d(Y)^2}}=\cos\theta$$

Then, the relationship between $\gamma$ and $\theta$ becomes as follows:

$$\gamma=\begin{cases}\cos\theta+\frac{1}{3}\sin\theta,\ 0\leq\theta\leq\frac{\pi}{4}\\ \sin\theta+\frac{1}{3}\cos\theta,\ \frac{\pi}{4}\leq\theta\leq\frac{\pi}{2}\end{cases}$$

By assigning suitable numerical values to $\theta$ and computing the corresponding values of $\gamma$ from the above relationship, the following table is obtained.

| $\theta$ (deg.) | $\gamma$ | $\theta$ (deg.) | $\gamma$ |
|---|---|---|---|
| 0 | 1.000 | 45 | 0.943 |
| 5 | 1.025 | 50 | 0.980 |
| 10 | 1.043 | 55 | 1.010 |
| 15 | 1.052 | 60 | 1.033 |
| 20 | 1.054 | 65 | 1.047 |
| 25 | 1.047 | 70 | 1.054 |
| 30 | 1.033 | 75 | 1.052 |
| 35 | 1.010 | 80 | 1.043 |
| 40 | 0.980 | 85 | 1.025 |
|  |  | 90 | 1.000 |

From the above description, it is apparent that the value of $d(R)$ obtained from the approximation $$\sqrt{d(X)^2+d(Y)^2}$$

can be used with an error of approximately ±6 percent.

Figure 7:
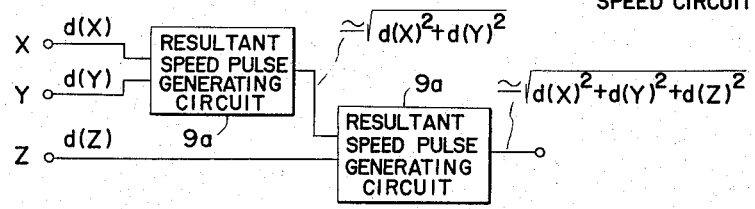
FIGURES 6 and 7 are block diagrams respectively showing the arrangement and composition of essential parts of the control system shown in FIGURE 3.

While the above description has been presented with respect to the case of two pulse trains, namely, the X terminal input pulse train and the Y terminal input pulse train, the invention may be applied in the same manner to three or more pulse trains. For example, by an arrangement similar to that shown in FIGURE 6 circuits $9a$ can be used with respect to a third pulse train (Z terminal input pulse train $\Delta S_{VIII}$ and the aforementioned resultant output pulse train, as indicated in FIGURE 7. Then, it is possible to generate a resultant pulse train having a pulse density which may be expressed by the following approximation.

$$\sqrt{d(X)^2+d(Y)^2+d(Z)^2}$$

The resultant speed pulse obtained in this manner is fed back to the speed control circuit 3. The operation of the speed control circuit 3 is as described hereinbefore.

Finally, the appearance as output of a carry pulse $C_2$ from the counter 404 within the variable length counter signifies that output pulse $\Delta S_I$, $\Delta S_{II}$, and $\Delta S_{III}$ of a number corresponding to the distance of displacement specified on the command tape have appeared at output terminals 106, 107, and 108. Accordingly, this carry pulse $C_2$ stops the command clock pulse generator 1, and the operation of the entire system stops.

Figure 4:
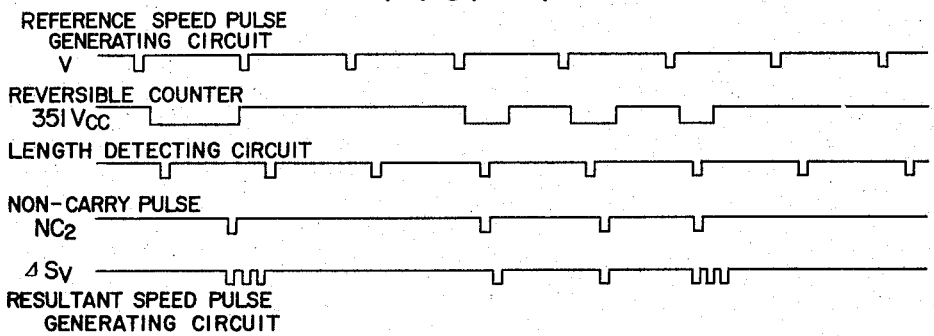
FIGURES 4 and 5 are pulse diagrams indicating the nature of the operation of the control system shown in FIGURE 3.
Figure 5:
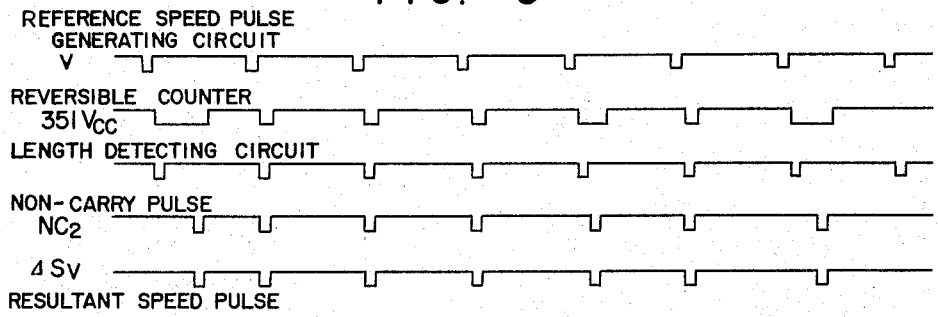

Referring to FIGURES 4 and 5, in which examples of operation of the speed control circuit 3 in the above described embodiment of the invention are indicated, the maximum number of signal digits is 8 digits. In each of FIGURES 4 and 5, the graphical representations in sequence from top to bottom represent: the output voltage V of the reference speed pulse generating circuit 2; the output (output terminal 351) of the reversible counter 301; the output of the length detecting circuit 403 of the variable length circuit 4; and the output $\Delta S_V$ of the resultant speed pulse generating circuit 9.

FIG. 4 shows the output pulse pattern when the pulses exist in all the digits from the first to eighth digit in the speed signal register 201, as well as the pulses exist in the digits from the third to the eighth digits in the registers I, II and III of the distance signal registers.

First, when the output V of the reference speed pulse generating circuit 2 is produced, the counter 301 of the speed control circuit 3 assumes the "1" state, and an output appears at the output terminal 351. Since the pulses exist in the third digit and fully thereafter in the distance signal register 5, an output pulse appears in the third digit at each cyclic period from the length detecting circuit 403.

Consequently, an input pulse enters in the third digit into the counter 404, from which a non-carry pulse $NC_2$ is produced in one of the digits from the third to the eighth digit.

Since the content of the distance signal register is such that all pulses are existing in the third digit and thereafter, one pulse of each of the output pulses $\Delta S_I$, $\Delta S_{II}$, and $\Delta S_{III}$ always appears each time the non-carry pulse $NC_2$ appears. That is, for example, it will be assumed that three pulses of $\Delta S_V$ have appeared with the initial non-carry pulse $NC_2$. Accordingly, the reversible counter 301 of the speed control circuit 3 is closed trebly and assumes the state "2." Therefore, for this circuit to return to the state "1," three pulses of the output V of the reference speed pulse generating circuit 2 must enter. When three pulses of the output V enter, the reversible counter 301 returns to the state "1."

At this time, an input enters the counter 404, and $NC_2$ is sent out. One pulse of each of the outputs $\Delta S_I$, $\Delta S_{II}$, and $\Delta S_{III}$ is sent out, but this time, it will be assumed that one pulse of the output of the resultant speed pulse generating circuit has been sent out. Consequently, the reversible counter 301 is closed once and assumes the state "2." Then, when one pulse of the output V of the reference speed pulse generating circuit 2 enters, the reversible counter 301 returns again to the state "1."

Similarly as before, a non-carry pulse $NC_2$ leaves the counter 404, and one pulse of each of the outputs $\Delta S_I$, $\Delta S_{II}$, and $\Delta S_{III}$ are sent out, and this time also, it will be assumed that, for example, one pulse of the output of the resultant speed pulse generating circuit 9 is sent out. Thereafter, the above described three operational steps are repeated in a similar manner.

It is to be observed from FIGURE 3 that, when 5 pulses of the output V of the reference speed pulse generating circuit 2 are sent out, 5 pulses of the output $\Delta S_V$ of the resultant speed pulse generating circuit 9, also, are sent out, and that the speed specified on the command tape and the actual resultant speed are equal.

In the case illustrated in FIGURE 4, the speed specified on the command tape is the same as that in the case illustrated in FIGURE 3, and only in the distance signal register 1, all pulses exist in the second digit and thereafter. In this case, since the control becomes one-dimensional, the speed specified on the command tape and the actual resultant speed naturally become equal.

Thus, the present invention affords the practical realization of a system for numerical control which directly specifies the resultant speed, and which, in regard to difficulties such as complexity of computation and uneconomical time and expenditure arising in the composition of the command tape, is far superior to the time command method which is one of the conventional methods for setting the displacement speeds of the displaced parts of an object to be numerically controlled.

That is, the invention makes possible, through the use of a resultant speed pulse generating circuit and a speed control circuit, a substantial decrease in the error between the speed specified on the command tape and the actual resultant speed even in the case of multiaxial control.

It should be understood, of course, that the foregoing disclosure relates to only a particular embodiment of the invention and that it is intended to cover all changes and modifications of the example of the invention herein chosen for the purposes of the disclosure, which do not constitute departures from the spirit and scope of the invention as set forth in the appended claim.

We claim:
1. A numerical control system for the speed control of tridimensional displacement of an object comprising: means to generate a reference speed pulse train proportional to a first numerical value corresponding to a speed of displacement specified by command for required relative displacement of an object being controlled; means to generate pulses in accordance with a group of second numerical values corresponding to the command to specify the geometrical feature of the said relative displacement; means to generate a resultant speed pulse train proportional to the resultant speed of the output componential speeds in the directions of the control axes; and means to compare said reference speed pulse train and said resultant speed pulse train and to generate a signal to control said pulse generator to decrease the difference between the two said pulse trains.

References Cited
UNITED STATES PATENTS 2,749,496  6/1956  Newman et al. _____ 328—155 X
3,303,421  2/1967  Kelling _____ 328—133 X JOHN S. HEYMAN, *Primary Examiner.*

ARTHUR GAUSS, *Examiner.*